US011867266B2

(12) United States Patent
Patel et al.

(10) Patent No.: US 11,867,266 B2
(45) Date of Patent: Jan. 9, 2024

(54) MULTI-SPEED PLANETARY TRANSMISSION

(71) Applicant: ALLISON TRANSMISSION, INC., Indianapolis, IN (US)

(72) Inventors: Nayan Patel, Avon, IN (US); Michael Rietdorf, Brownsburg, IN (US); Jorge F. Briceno, Brownsburg, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 17/783,466

(22) PCT Filed: Dec. 17, 2020

(86) PCT No.: PCT/US2020/065626
§ 371 (c)(1),
(2) Date: Jun. 8, 2022

(87) PCT Pub. No.: WO2021/133631
PCT Pub. Date: Jul. 1, 2021

(65) Prior Publication Data
US 2023/0115225 A1    Apr. 13, 2023

Related U.S. Application Data

(60) Provisional application No. 62/952,672, filed on Dec. 23, 2019.

(51) Int. Cl.
*F16H 3/66* (2006.01)
*F16H 37/04* (2006.01)

(52) U.S. Cl.
CPC ......... *F16H 3/66* (2013.01); *F16H 2037/049* (2013.01); *F16H 2200/0065* (2013.01);
(Continued)

(58) Field of Classification Search
CPC ..... F16H 2200/2015; F16H 2200/2051; F16H 3/66; F16H 2037/049
See application file for complete search history.

(56) References Cited

U.S. PATENT DOCUMENTS 3,031,901 A    5/1962  Simpson
4,346,623 A *  8/1982  Tatsuo ...................... F16H 3/66
                                                      475/286
(Continued)

FOREIGN PATENT DOCUMENTS

CN    205013605 U  *  2/2016
DE       3024862 A1     1/1982
(Continued)

OTHER PUBLICATIONS

U.S. Patent and Trademark Office; International Search Report and Written Opinion; International Application No. PCT/US20/65626; dated Mar. 8, 2021.
(Continued)

*Primary Examiner* — Stacey A Fluhart
(74) *Attorney, Agent, or Firm* — Faegre Drinker Biddle & Reath LLP

(57) ABSTRACT

A multi-speed transmission including a plurality of planetary gearsets and a plurality of selective couplers to achieve at least nine forward speed ratios and at least nine reverse speed ratios is disclosed. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. The multi-speed transmission may have five planetary gearsets and eight selective couplers. The eight selective couplers may include three clutches and five brakes.

24 Claims, 2 Drawing Sheets

(52) U.S. Cl.
CPC ............... *F16H 2200/2015* (2013.01); *F16H 2200/2051* (2013.01)

(56) References Cited

U.S. PATENT DOCUMENTS

| | | | |
|---|---|---|---|
| 4,531,428 A * | 7/1985 | Windish | F16H 3/66 475/279 |
| 4,683,776 A * | 8/1987 | Klemen | F16H 3/66 475/286 |
| 5,924,951 A * | 7/1999 | Winzeler | F16H 3/666 475/275 |
| 6,955,627 B2 | 10/2005 | Thomas et al. | |
| 7,285,069 B2 | 10/2007 | Klemen | |
| 7,785,225 B2 | 8/2010 | Phillips et al. | |
| 8,083,631 B2 | 12/2011 | Shiohara | |
| 8,292,767 B2 | 10/2012 | Borgerson et al. | |
| 8,465,390 B2 | 6/2013 | Brehmer et al. | |
| 8,480,533 B2 | 7/2013 | Meyer et al. | |
| 8,485,934 B2 | 7/2013 | Gumpoltsberger et al. | |
| 8,702,554 B2 | 4/2014 | Gumpoltsberger et al. | |
| 8,715,128 B2 | 5/2014 | Kempf et al. | |
| 8,801,562 B2 | 8/2014 | Etchason | |
| 8,801,563 B2 | 8/2014 | Ohnemus et al. | |
| 8,827,862 B2 | 9/2014 | Koch et al. | |
| 8,845,477 B2 | 9/2014 | Koch et al. | |
| 8,864,618 B1 | 10/2014 | Noh et al. | |
| 8,870,704 B2 | 10/2014 | Maurer et al. | |
| 8,992,373 B2 | 3/2015 | Beck et al. | |
| 9,175,747 B2 | 11/2015 | Lippert et al. | |
| 9,267,577 B2 * | 2/2016 | Kaltenbach | F16H 3/666 |
| 9,291,244 B2 | 3/2016 | Lippert | |
| 9,334,930 B2 | 5/2016 | Kaltenbach | |
| 9,382,988 B2 | 7/2016 | Schoolcraft | |
| 9,458,910 B2 | 10/2016 | Beck et al. | |
| 9,625,007 B2 | 4/2017 | Long et al. | |
| 9,644,724 B2 | 5/2017 | Schoolcraft | |
| 9,759,299 B2 | 9/2017 | Beck et al. | |
| 9,784,344 B1 | 10/2017 | Cho et al. | |
| 9,869,372 B2 | 1/2018 | Goleski et al. | |
| 9,933,047 B1 | 4/2018 | Cho et al. | |
| 10,054,198 B2 | 8/2018 | Etchason | |
| 10,156,284 B2 | 12/2018 | Warth et al. | |
| 10,161,484 B2 | 12/2018 | Tryon et al. | |
| 10,174,814 B2 | 1/2019 | Schoolcraft et al. | |
| 10,323,722 B2 | 6/2019 | Schoolcraft et al. | |
| 10,337,590 B2 | 7/2019 | Irving et al. | |
| 10,344,836 B2 | 7/2019 | Kim et al. | |
| 10,495,188 B2 | 12/2019 | Dersjo et al. | |
| 2008/0103015 A1 | 5/2008 | Seo | |
| 2010/0069195 A1 | 3/2010 | Baldwin | |
| 2014/0038766 A1 * | 2/2014 | Koch | F16H 3/66 475/275 |
| 2016/0061304 A1 | 3/2016 | Kaltenbach et al. | |
| 2016/0169349 A1 | 6/2016 | Park et al. | |
| 2018/0087625 A1 * | 3/2018 | Crafton | F16H 3/663 |

FOREIGN PATENT DOCUMENTS

| | | |
|---|---|---|
| DE | 102006044882 A1 | 4/2007 |
| DE | 102012216225 A1 | 3/2014 |
| GB | 1513076 A | 6/1978 |

OTHER PUBLICATIONS

Allison Transmissions Will Work As Hard As You Do; Specialty Series; 2017.
Sherman, Don; Chevrolet Debuts Nine-Speed Automatic Slated for Malibu, Cruze Diesel, and New Equinox; Dec. 6, 2016.
Tinker, Matthew Michael; Wheel loader powertrain modeling for real-time vehicle dynamic simulation; Iowa Research Online; Jul. 2006.
Nezhadali, V. et al.; A framework for modeling and optimal control of automatic transmission systems; 2015.
Xu, Xiangyang et al.; Progress in Automotive Transmission Technology; Automotive Innovation; Aug. 23, 2018.

* cited by examiner

| GEAR | 158 | 160 | 162 | 164 | 166 | 168 | 170 | 172 |
|---|---|---|---|---|---|---|---|---|
| N |   |   |   |   |   |   |   |   |
| 1st | X |   |   |   |   |   | X |   |
| 2nd | X |   |   |   | X |   | X |   |
| 3rd | X |   |   |   |   | X | X |   |
| 4th | X |   |   | X |   |   | X |   |
| 5th | X |   | X |   |   |   | X |   |
| 6th |   | X |   |   |   | X | X |   |
| 7th |   | X | X |   |   |   | X |   |
| 8th |   | X |   | X |   |   |   |   |
| 9th |   | X |   |   | X |   |   |   |
| 1st Rev | X |   |   |   |   |   |   | X |
| 2nd Rev | X |   |   |   | X |   |   | X |
| 3rd Rev | X |   |   |   |   | X |   | X |
| 4th Rev | X |   |   | X |   |   |   | X |
| 5th Rev | X | X | X |   |   |   |   | X |
| 6th Rev |   | X |   |   |   |   |   | X |
| 7th Rev |   | X | X |   |   |   |   | X |
| 8th Rev |   | X |   |   |   | X |   | X |
| 9th Rev |   | X |   |   |   |   |   | X |

"X" = ENGAGED CONFIGURATION
"BLANK" = DISENGAGED CONFIGURATION

MULTI-SPEED PLANETARY TRANSMISSION

RELATED APPLICATION

The present application is a national stage application of PCT application No. PCT/US2020/065626, filed Dec. 17, 2020, which claims the benefit of U.S. Provisional Application No. 62/952,672, filed Dec. 23, 2019, titled MULTI-SPEED PLANETARY TRANSMISSION, the entire disclosures of which are expressly incorporated by reference herein.

FIELD OF THE DISCLOSURE

The present disclosure relates to a multi-speed transmission and in particular to a multi-speed transmission including a plurality of planetary gearsets and a plurality of selective couplers to achieve a plurality of forward speed ratios and a plurality of reverse speed ratios.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in U.S. Pat. No. 9,625,007, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least nine forward speed ratios wherein the output member rotates in the same direction as the input member and at least nine reverse speed ratios wherein the output member rotates in the opposite direction as the input member. The plurality of planetary gearsets may include a first planetary gearset, a second planetary gearset, a third planetary gearset, a fourth planetary gearset, and a fifth planetary gearset. The plurality of selective couplers may include a number of clutches and a number of brakes. In one example, the present disclosure provides a multi-speed transmission having five planetary gearsets and eight selective couplers. The eight selective couplers may include three clutches and five brakes. The eight selective couplers may be selectively engaged to establish an equal number of forward speed ratios and reverse speed ratios. The eight selective couplers may be selectively engaged to establish at least nine forward speed ratios and at least nine reverse speed ratios.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, the fourth planetary gearset, and the fifth planetary gearset, depending on the language of the claims.

In an exemplary embodiment of the present disclosure, a transmission is provided. The transmission comprising: at least one stationary member; an input member rotatable relative to the at least one stationary member; and a plurality of planetary gearsets operatively coupled to the input member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the fifth planetary gearset. The transmission further comprising an output member operatively coupled to the input member through the plurality of planetary gearsets and rotatable relative to the at least one stationary member, the output member is fixedly coupled to the second gearset component of the fourth planetary gearset; a first interconnector which fixedly couples the second gearset component of the first planetary gearset, the second gearset component of the second planetary gearset, and the third gearset component of the third planetary gearset together; a second interconnector which fixedly couples the third gearset component of the first planetary gearset and the first gearset component of the second planetary gearset together; a third interconnector which fixedly couples the second gearset component of the third planetary gearset and the third gearset component of the fourth planetary gearset together; a fourth interconnector which fixedly couples the first gearset component of the third planetary gearset and the first gearset component of the fourth planetary gearset together; a fifth interconnector which fixedly couples the third gearset component of the fifth planetary gearset and the first gearset component of the first planetary gearset together; and a plurality of selective couplers. The plurality of selective couplers includes: a first selective coupler which, when engaged, fixedly couples the third gearset component of the fifth planetary gearset and the first gearset component of the first planetary gearset to the first gearset component of the third planetary gearset and the first gearset component of the fourth planetary gearset; a second selective coupler which, when engaged, fixedly couples the third gearset component of the fifth planetary gearset and the first gearset component of the first planetary gearset to the second gearset component of the third planetary gearset and the third gearset component of the fourth planetary gearset; a third selective coupler which, when engaged, fixedly couples the third gearset component of the first planetary gearset and the first gearset component of the second planetary gearset to the at least one stationary member; a fourth selective coupler which, when engaged, fixedly couples the second gearset component of the first planetary gearset, the second gearset component of the second planetary gearset, and the third gearset component of the third planetary gearset to the at least one stationary member; a fifth selective coupler which, when engaged, fixedly couples the second gearset component of the third planetary gearset and the third gearset component of the fourth planetary gearset to the at least one stationary member; a sixth selective coupler which, when engaged, fixedly couples the third gearset component of the second planetary gearset to the at least one stationary member; a seventh selective coupler which, when engaged, fixedly couples the input member to the third gearset component of the fifth planetary gearset and the first gearset component of the first planetary gearset; and an eighth selective coupler which, when engaged, fixedly couples the second gearset component of the fifth planetary gearset to the at least one stationary member.

In an example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear; the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In another example thereof, the at least one stationary member includes a housing, the housing having a first end and a second end, wherein the input member is accessible proximate the first end of the housing; the output member is accessible proximate the second end of the housing; the first planetary gearset, the second planetary gearset, the third planetary gearset, and the fourth planetary gearset are positioned between the fifth planetary gearset and the second end of the housing; and the fifth planetary gearset is positioned between first end of the housing and the first planetary gearset, the second planetary gearset, the third planetary gearset, and the fourth planetary gearset. In a variation thereof, the first planetary gearset is positioned between fifth planetary gearset and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In a further example thereof, the plurality of selective couplers are selectively engaged in a plurality of combinations to establish at least nine forward speed ratios and at least nine reverse speed ratios between the input member and the output member, each of the plurality of combinations having at least three of the plurality of selective couplers engaged.

In still another example thereof, the plurality of selective couplers are selectively engaged in a plurality of combinations to establish a first number of forward speed ratios and a second number of reverse speed ratios between the input member and the output member. Each of the plurality of combinations having at least three of the plurality of selective couplers engaged, the second number being equal to the first number.

In another exemplary embodiment of the present disclosure, a transmission is provided. The transmission comprising: at least one stationary member; an input member rotatable relative to the at least one stationary member; and a plurality of planetary gearsets operatively coupled to the input member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. Each of the first planetary gearset, the second planetary gearset, the third planetary gearset, the fourth planetary gearset, and the fifth planetary gearset is a simple planetary gearset. The input member is fixedly coupled to only one of the plurality of planetary gearsets. The transmission further comprising an output member operatively coupled to the input member through the plurality of planetary gearsets and rotatable relative to the at least one stationary member; and a plurality of selective couplers operatively coupled to the plurality of planetary gearsets. The plurality of selective couplers are selectively engaged in a plurality of combinations to establish a first number of forward speed ratios and a second number of reverse speed ratios between the input member and the output member, the plurality of selective couplers including a third number of brakes and a fourth number of clutches, the fourth number being less than the third number by two.

In an example thereof, the second number is equal to the first number. In a variation thereof, each of the plurality of combinations has three of the plurality of selective couplers engaged.

In another example thereof, the input member is fixedly coupled to the first gearset component of the fifth planetary gearset and the output member is fixedly coupled to the second gearset component of the fourth planetary gearset.

In a further example thereof, the transmission further comprising: a first interconnector which fixedly couples the second gearset component of the first planetary gearset, the second gearset component of the second planetary gearset, and the third gearset component of the third planetary gearset together; a second interconnector which fixedly couples the third gearset component of the first planetary gearset and the first gearset component of the second planetary gearset together; a third interconnector which fixedly couples the second gearset component of the third planetary gearset and the third gearset component of the fourth planetary gearset together; a fourth interconnector which fixedly couples the first gearset component of the third planetary gearset and the first gearset component of the fourth planetary gearset together; and a fifth interconnector which fixedly couples the third gearset component of the fifth planetary gearset and the first gearset component of the first planetary gearset together.

In still another example, the plurality of selective couplers includes: a first selective coupler which, when engaged, fixedly couples the third gearset component of the fifth planetary gearset and the first gearset component of the first planetary gearset to the first gearset component of the third planetary gearset and the first gearset component of the fourth planetary gearset; a second selective coupler which, when engaged, fixedly couples the third gearset component of the fifth planetary gearset and the first gearset component of the first planetary gearset to the second gearset component of the third planetary gearset and the third gearset component of the fourth planetary gearset; a third selective coupler which, when engaged, fixedly couples the third gearset component of the first planetary gearset and the first gearset component of the second planetary gearset to the at least one stationary member; a fourth selective coupler which, when engaged, fixedly couples the second gearset component of the first planetary gearset, the second gearset component of the second planetary gearset, and the third gearset component of the third planetary gearset to the at least one stationary member; a fifth selective coupler which, when engaged, fixedly couples the second gearset component of the third planetary gearset and the third gearset component of the fourth planetary gearset to the at least one stationary member; a sixth selective coupler which, when engaged, fixedly couples the third gearset component of the second planetary gearset to the at least one stationary member; a seventh selective coupler which, when engaged, fixedly couples the input member to the third gearset component of the fifth planetary gearset and the first gearset component of the first planetary gearset; and an eighth selective coupler which, when engaged, fixedly couples the second gearset component of the fifth planetary gearset to the at least one stationary member.

In a further still example thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear; the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In a yet further still example thereof, the at least one stationary member includes a housing. The housing having a first end and a second end. The input member is accessible proximate the first end of the housing. The output member is accessible proximate the second end of the housing. The first planetary gearset, the second planetary gearset, the third planetary gearset, and the fourth planetary gearset are positioned between the fifth planetary gearset and the second end of the housing. The fifth planetary gearset is positioned between first end of the housing and the first planetary gearset, the second planetary gearset, the third planetary gearset, and the fourth planetary gearset. In the variation thereof, the first planetary gearset is positioned between fifth planetary gearset and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In a further exemplary embodiment of the present disclosure, a transmission is provided. The transmission comprising: at least one stationary member; an input member rotatable relative to the at least one stationary member; and a plurality of planetary gearsets operatively coupled to the input member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. Each of the first planetary gearset, the second planetary gearset, the third planetary gearset, the fourth planetary gearset, and the fifth planetary gearset is a simple planetary gearset. The transmission further comprising an output member operatively coupled to the input member through the plurality of planetary gearsets and rotatable relative to the at least one stationary member; and a plurality of selective couplers operatively coupled to the plurality of planetary gearsets. The plurality of selective couplers are selectively engaged in a plurality of combinations to establish a first number of forward speed ratios and a second number of reverse speed ratios between the input member and the output member. The plurality of selective couplers including a third number of brakes and a fourth number of clutches. The third number is odd and two more than the fourth number.

In an example thereof, the second number is equal to the first number. In a variation thereof, each of the plurality of combinations has three of the plurality of selective couplers engaged.

In another example thereof, the input member is fixedly coupled to the first gearset component of the fifth planetary gearset and the output member is fixedly coupled to the second gearset component of the fourth planetary gearset.

In a further example thereof, the transmission further comprising: a first interconnector which fixedly couples the second gearset component of the first planetary gearset, the second gearset component of the second planetary gearset, and the third gearset component of the third planetary gearset together; a second interconnector which fixedly couples the third gearset component of the first planetary gearset and the first gearset component of the second planetary gearset together; a third interconnector which fixedly couples the second gearset component of the third planetary gearset and the third gearset component of the fourth planetary gearset together; a fourth interconnector which fixedly couples the first gearset component of the third planetary gearset and the first gearset component of the fourth planetary gearset together; and a fifth interconnector which fixedly couples the third gearset component of the fifth planetary gearset and the first gearset component of the first planetary gearset together.

In a yet further example thereof, the plurality of selective couplers includes: a first selective coupler which, when engaged, fixedly couples the third gearset component of the fifth planetary gearset and the first gearset component of the first planetary gearset to the first gearset component of the third planetary gearset and the first gearset component of the fourth planetary gearset; a second selective coupler which, when engaged, fixedly couples the third gearset component of the fifth planetary gearset and the first gearset component of the first planetary gearset to the second gearset component of the third planetary gearset and the third gearset component of the fourth planetary gearset; a third selective coupler which, when engaged, fixedly couples the third gearset component of the first planetary gearset and the first gearset component of the second planetary gearset to the at least one stationary member; a fourth selective coupler which, when engaged, fixedly couples the second gearset component of the first planetary gearset, the second gearset component of the second planetary gearset, and the third gearset component of the third planetary gearset to the at least one stationary member; a fifth selective coupler which, when engaged, fixedly couples the second gearset component of the third planetary gearset and the third gearset component of the fourth planetary gearset to the at least one stationary member; a sixth selective coupler which, when engaged, fixedly couples the third gearset component of the second planetary gearset to the at least one stationary member; a seventh selective coupler which, when engaged, fixedly couples the input member to the third gearset component of the fifth planetary gearset and the first gearset component of the first planetary gearset; and an eighth selective coupler which, when engaged, fixedly couples the second gearset component of the fifth planetary gearset to the at least one stationary member.

In still a further example thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear; the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In still another example thereof, the at least one stationary member includes a housing. The housing having a first end and a second end. The input member is accessible proximate the first end of the housing. The output member is accessible proximate the second end of the housing. The first planetary gearset, the second planetary gearset, the third planetary gearset, and the fourth planetary gearset are positioned between the fifth planetary gearset and the second end of the housing. The fifth planetary gearset is positioned between first end of the housing and the first planetary gearset, the second planetary gearset, the third planetary gearset, and the fourth planetary gearset. In a variation thereof, the first planetary gearset is positioned between fifth planetary gearset and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the eight selective couplers of FIG. 1 to provide nine forward gear or speed ratios and nine reverse gear or speed ratios of the multi-speed transmission of FIG. 1.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
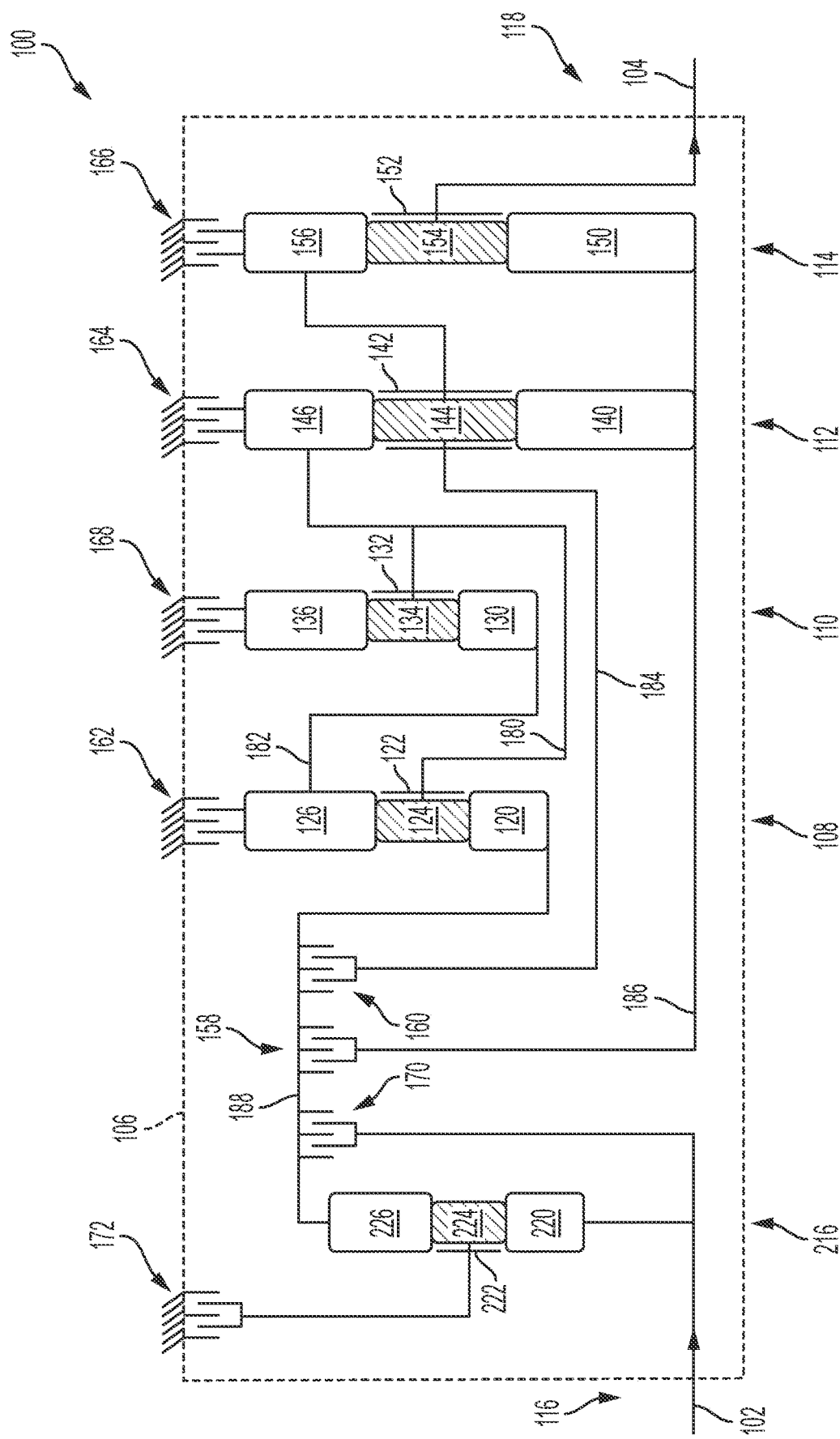
FIG. 1 is a diagrammatic view of an exemplary multi-speed transmission including five planetary gearsets and eight selective couplers.

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated U.S. Pat. No. 9,625,007.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, a pump, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least nine forward gear or speed ratios relative to the input member, illustratively nine forward gear or speed ratios, and in at least nine reverse gear or speed ratios relative to the input member, illustratively nine reverse gear or speed ratios. The architecture disclosed herein may be utilized to achieve various gear ratios based on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, a fourth planetary gearset 114, and a fifth planetary gearset 216. In one embodiment, additional planetary gearsets may be included. Further, although first planetary gearset 108, second planetary gearset 110, third planetary gearset 112, fourth planetary gearset 114, and fifth planetary gearset 216 are illustrated as simple planetary gearsets, it is contemplated that compound planetary gearsets may be included in some embodiments.

In one embodiment, multi-speed transmission 100 is arranged as illustrated in FIG. 1, with fifth planetary gearset 216 positioned between a first location or end 116 at which input member 102 enters stationary member 106 and first planetary gearset 108, first planetary gearset 108 is positioned between fifth planetary gearset 216 and second planetary gearset 110, second planetary gearset 110 is positioned between first planetary gearset 108 and third planetary gearset 112, third planetary gearset 112 is positioned between second planetary gearset 110 and fourth planetary gearset 114, fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, fourth planetary gearset 114, and fifth planetary gearset 216 are arranged in any order relative to location 116 and location 118. In embodiments, each of first planetary gearset 108, second planetary gearset 110, third planetary gearset 112, fourth planetary gearset 114, and fifth planetary gearset 216 are axially aligned. In one example, input member 102 and output member 104 are also axially aligned with first planetary gearset 108, second planetary gearset 110, third planetary gearset 112, fourth planetary gearset 114, and fifth planetary gearset 216. In alternative embodiments, one or more of input member 102, output member 104, first planetary gearset 108, second planetary gearset 110, third planetary gearset 112, fourth planetary gearset 114, and fifth planetary gearset 216 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156. Fifth planetary gearset 216 includes a sun gear 220, a planet carrier 222 supporting a plurality of planet gears 224, and a ring gear 226.

Multi-speed transmission 100 further includes a plurality of selective couplers, illustratively a first selective coupler 158, a second selective coupler 160, a third selective coupler 162, a fourth selective coupler 164, a fifth selective coupler 166, a sixth selective coupler 168, a seventh selective coupler 170, and an eighth selective coupler 172. In the illustrated embodiment, first selective coupler 158, second selective coupler 160, and seventh selective coupler 170 are clutches and third selective coupler 162, fourth selective coupler 164, fifth selective coupler 166, sixth selective coupler 168, and eighth selective coupler 172 are brakes.

The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to sun gear 220 of fifth planetary gearset 216 and seventh selective coupler 170. Output member 104 is fixedly coupled to planet carrier 152 of fourth planetary gearset 114. Planet carrier 122 of first planetary gearset 108 is fixedly coupled to planet carrier 132 of second planetary gearset 110 and ring gear 146 of third planetary gearset 112. Ring gear 126 of first planetary gearset 108 is fixedly coupled to sun gear 130 of second planetary gearset 110 and third selective coupler 162. Ring gear 136 of second planetary gearset 110 is fixedly coupled to sixth selective coupler 168. Sun gear 140 of third planetary gearset 112 is fixedly coupled to sun gear 150 of fourth planetary gearset 114 and first selective coupler 158. Planet carrier 142 of third planetary gearset 112 is fixedly coupled to ring gear 156 of fourth planetary gearset 114 and second selective coupler 160. Ring gear 156 of fourth planetary gearset 114 is also fixedly coupled to fifth selective coupler 166. Planet carrier 222 of fifth planetary gearset 216 is fixedly coupled to eighth selective coupler 172. Ring gear 226 of fifth planetary gearset 216 is fixedly coupled first selective coupler 158, second selective coupler 160, seventh selective coupler 170, and sun gear 120 of first planetary gearset 108. In alternative embodiments, one or more of the components fixedly coupled together are selectively coupled together through one or more selective couplers.

Multi-speed transmission 100 may be described as having six interconnectors. Input member 102 is a first interconnector that both provides input torque to multi-speed transmission 100 and fixedly couples sun gear 220 of fifth planetary gearset 216 and seventh selective coupler 170. A second interconnector 180 fixedly couples planet carrier 122 of first planetary gearset 108, planet carrier 132 of second planetary gearset 110, and ring gear 146 of third planetary gearset 112. A third interconnector 182 fixedly couples ring gear 126 of first planetary gearset 108 to sun gear 130 of second planetary gearset 110. A fourth interconnector 184 fixedly couples ring gear 156 of fourth planetary gearset 114, planet carrier 142 of third planetary gearset 112, and second selective coupler 160. A fifth interconnector 186 fixedly couples sun gear 140 of third planetary gearset 112, sun gear 150 of fourth planetary gearset 114, and first selective coupler 158. A sixth interconnector 188 fixedly couples sun gear 120 of first planetary gearset 108, ring gear 226 of fifth planetary gearset 216, first selective coupler 158, second selective coupler 160, and seventh selective coupler 170.

Multi-speed transmission 100 further includes several components that are illustratively shown as being selectively coupled together through selective couplers. First selective coupler 158, when engaged, fixedly couples sun gear 120 of first planetary gearset 108, ring gear 226 of fifth planetary gearset 216, second selective coupler 160, and seventh selective coupler 170 to sun gear 140 of third planetary gearset 112 and sun gear 150 of fourth planetary gearset 114. When first selective coupler 158 is disengaged, sun gear 120 of first planetary gearset 108, ring gear 226 of fifth planetary gearset 216 may rotate relative to sun gear 140 of third planetary gearset 112 and sun gear 150 of fourth planetary gearset 114.

Second selective coupler 160, when engaged, fixedly couples sun gear 120 of first planetary gearset 108, ring gear 226 of fifth planetary gearset 216, first selective coupler 158, and seventh selective coupler 170 to planet carrier 142 of third planetary gearset 112 and ring gear 156 of fourth planetary gearset 114. When second selective coupler 160 is disengaged, sun gear 120 of first planetary gearset 108 and ring gear 226 of fifth planetary gearset 216 may rotate relative to planet carrier 142 of third planetary gearset 112 and ring gear 156 of fourth planetary gearset 114.

Third selective coupler 162, when engaged, fixedly couples ring gear 126 of first planetary gearset 108 and sun gear 130 of second planetary gearset 110 to stationary member 106. When third selective coupler 162 is disengaged, ring gear 126 of first planetary gearset 108 and sun gear 130 of second planetary gearset 110 may rotate relative to stationary member 106.

Fourth selective coupler 164, when engaged, fixedly couples ring gear 146 of third planetary gearset 112, planet carrier 132 of second planetary gearset 110, and planet carrier 122 of first planetary gearset 108 to stationary member 106. When fourth selective coupler 164 is disengaged, ring gear 146 of third planetary gearset 112, planet carrier 132 of second planetary gearset 110, and planet carrier 122 of first planetary gearset 108 may rotate relative to stationary member 106.

Fifth selective coupler 166, when engaged, fixedly couples ring gear 156 of fourth planetary gearset 114, planet carrier 142 of third planetary gearset 112, and second selective coupler 160 to stationary member 106. When fifth selective coupler 166 is disengaged, ring gear 156 of fourth planetary gearset 114 and planet carrier 142 of third planetary gearset 112 may rotate relative to stationary member 106.

Sixth selective coupler 168, when engaged, fixedly couples ring gear 136 of second planetary gearset 110 to stationary member 106. When sixth selective coupler 168 is disengaged, ring gear 136 of second planetary gearset 110 may rotate relative to stationary member 106.

Seventh selective coupler 170, when engaged, fixedly couples together at least two components of the same planetary gearset. More specifically, seventh selective coupler 170, when engaged, fixedly couples sun gear 120 of first planetary gearset 108 and ring gear 226 of fifth planetary gearset 216 to sun gear 220 of fifth planetary gearset 216 and input member 102. When seventh selective coupler 170 is engaged, ring gear 226 and sun gear 220 of fifth planetary gearset 216 are locked together. Therefore, sun gear 220, planet carrier 222, and ring gear 226 all rotate together as a single unit. The same effect may be realized by coupling any two of sun gear 220, planet carrier 222, and ring gear 226 together. When seventh selective coupler 170 is disengaged, sun gear 120 of first planetary gearset 108 and ring gear 226 of sun gear 220 may rotate relative to sun gear 220 of fifth planetary gearset 216 and input member 102.

Eighth selective coupler 172, when engaged, fixedly couples planet carrier 222 of fifth planetary gearset 216 to stationary member 106. When eighth selective coupler 172 is disengaged, planet carrier 222 of fifth planetary gearset 216 may rotate relative to stationary member 106.

By engaging various combinations of first selective coupler 158, second selective coupler 160, third selective coupler 162, fourth selective coupler 164, fifth selective coupler 166, sixth selective coupler 168, seventh selective coupler 170, and eighth selective coupler 172, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least nine forward gear or speed ratios and at least nine reverse gear or speed ratios. In the exemplary embodiment shown, selective couplers 158-168 are selectively engageable to establish the at least nine forward gear or speed ratios and the at least nine reverse gear or speed ratio. The engagement of selective couplers 170, 172 may be switched to reverse the rotational direction of fifth planetary gearset 216 relative to input member 102 to convert each of the at least nine forward gear or speed ratios to a complementary reverse gear or speed ratio.

Referring to FIG. 2, an exemplary truth table 200 is shown that provides the state of each of first selective coupler 158, second selective coupler 160, third selective coupler 162, fourth selective coupler 164, fifth selective coupler 166, sixth selective coupler 168, seventh selective coupler 170, and eighth selective coupler 172 for nine different forward gear or speed ratios and nine reverse gear or speed ratios. Each row corresponds to a given interconnection arrangement for transmission 100. The first column provides the gear range (N-9$^{th}$ Rev gear ratios). The remaining columns illustrate which ones of the selective couplers 158-172 are engaged ("X" indicates engaged) and which ones of selective couplers 158-172 are disengaged ("(blank)" indicates disengaged). FIG. 2 is only one example of any number of truth tables possible for achieving at least nine forward speed or gear ratios and at least nine reverse speed or gear ratios.

In the example of FIG. 2, to place multi-speed transmission in neutral (N), all of first selective coupler 158, second selective coupler 160, third selective coupler 162, fourth selective coupler 164, fifth selective coupler 166, sixth selective coupler 168, seventh selective coupler 170, and eighth selective coupler 172 are in the disengaged configuration. One or more of first selective coupler 158, second selective coupler 160, third selective coupler 162, fourth selective coupler 164, fifth selective coupler 166, sixth selective coupler 168, seventh selective coupler 170, and eighth selective coupler 172 may remain engaged in neutral (N) as long as the combination of first selective coupler 158, second selective coupler 160, third selective coupler 162, third selective coupler 162, fifth selective coupler 166, sixth selective coupler 168, seventh selective coupler 170, and eighth selective coupler 172 does not transmit torque from input member 102 to output member 104.

A first forward gear or speed ratio (shown as 1$^{st}$) in exemplary truth table 200 of FIG. 2 is achieved by having fifth selective coupler 166, sixth selective coupler 168, and seventh selective coupler 170 in an engaged configuration and first selective coupler 158, second selective coupler 160, third selective coupler 162, fourth selective coupler 164, and eighth selective coupler 172 in a disengaged configuration.

A second or subsequent forward gear or speed ratio (shown as 2$^{nd}$) in exemplary truth table 200 of FIG. 2 is achieved by having first selective coupler 158, fifth selective coupler 166, and seventh selective coupler 170 in an engaged configuration and second selective coupler 160, third selective coupler 162, fourth selective coupler 164, sixth selective coupler 168, and eighth selective coupler 172 in a disengaged configuration. Therefore, when transitioning between the first forward gear or speed ratio and the second forward gear or speed ratio, sixth selective coupler 168 is placed in the disengaged configuration and first selective coupler 158 is placed in the engaged configuration.

A third or subsequent forward gear or speed ratio (shown as 3$^{rd}$) in exemplary truth table 200 of FIG. 2 is achieved by having first selective coupler 158, sixth selective coupler 168, and seventh selective coupler 170 in an engaged configuration and second selective coupler 160, third selective coupler 162, fourth selective coupler 164, fifth selective coupler 166, and eighth selective coupler 172 in a disengaged configuration. Therefore, when transitioning between the second forward gear or speed ratio and the third forward gear or speed ratio, fifth selective coupler 166 is placed in the disengaged configuration and sixth selective coupler 168 is placed in the engaged configuration.

A fourth or subsequent forward gear or speed ratio (shown as 4$^{th}$) in exemplary truth table 200 of FIG. 2 is achieved by having first selective coupler 158, fourth selective coupler 164, and seventh selective coupler 170 in an engaged configuration and second selective coupler 160, third selective coupler 162, fifth selective coupler 166, sixth selective coupler 168, and eighth selective coupler 172 in a disengaged configuration. Therefore, when transitioning between the third forward gear or speed ratio and the fourth forward gear or speed ratio, sixth selective coupler 168 is placed in the disengaged configuration and fourth selective coupler 164 is placed in the engaged configuration.

A fifth or subsequent forward gear or speed ratio (shown as 5$^{th}$) in exemplary truth table 200 of FIG. 2 is achieved by having first selective coupler 158, third selective coupler 162, and seventh selective coupler 170 in an engaged configuration and second selective coupler 160, fourth selective coupler 164, fifth selective coupler 166, sixth selective coupler 168, and eighth selective coupler 172 in a disengaged configuration. Therefore, when transitioning between the fourth forward gear or speed ratio and the fifth forward gear or speed ratio, fourth selective coupler 164 is placed in the disengaged configuration and third selective coupler 162 is placed in the engaged configuration.

A sixth or subsequent forward gear or speed ratio (shown as 6$^{th}$) in exemplary truth table 200 of FIG. 2 is achieved by having first selective coupler 158, second selective coupler 160, and seventh selective coupler 170 in an engaged configuration and third selective coupler 162, fourth selective coupler 164, fifth selective coupler 166, sixth selective coupler 168, and eighth selective coupler 172 in a disengaged configuration. Therefore, when transitioning between the fifth forward gear or speed ratio and the sixth forward gear or speed ratio, third selective coupler 162 is placed in the disengaged configuration and second selective coupler 160 is placed in the engaged configuration.

A seventh or subsequent forward gear or speed ratio (shown as 7$^{th}$) in exemplary truth table 200 of FIG. 2 is achieved by having second selective coupler 160, third selective coupler 162, and seventh selective coupler 170 in an engaged configuration and first selective coupler 158, fourth selective coupler 164, fifth selective coupler 166, sixth selective coupler 168, and eighth selective coupler 172 in a disengaged configuration. Therefore, when transitioning between the sixth forward gear or speed ratio and the seventh forward gear or speed ratio, first selective coupler 158 is placed in the disengaged configuration and third selective coupler 162 is placed in the engaged configuration.

An eighth or subsequent forward gear or speed ratio (shown as 8$^{th}$) in exemplary truth table 200 of FIG. 2 is achieved by having second selective coupler 160, fourth selective coupler 164, and seventh selective coupler 170 in an engaged configuration and first selective coupler 158, third selective coupler 162, fifth selective coupler 166, sixth selective coupler 168, and eighth selective coupler 172 in a disengaged configuration. Therefore, when transitioning between the seventh forward gear or speed ratio and the eighth forward gear or speed ratio, third selective coupler 162 is placed in the disengaged configuration and fourth selective coupler 164 is placed in the engaged configuration.

A ninth or subsequent forward gear or speed ratio (shown as $9^{th}$) in exemplary truth table 200 of FIG. 2 is achieved by having second selective coupler 160, sixth selective coupler 168, and seventh selective coupler 170 in an engaged configuration and first selective coupler 158, third selective coupler 162, fourth selective coupler 164, fifth selective coupler 166, and eighth selective coupler 172 in a disengaged configuration. Therefore, when transitioning between the eighth forward gear or speed ratio and the ninth forward gear or speed ratio, fourth selective coupler 164 is placed in the disengaged configuration and sixth selective coupler 168 is placed in the engaged configuration.

In each of the $1^{st}$ through $9^{th}$ forward gear or speed ratios, at least three of selective couplers 158-172 are in an engaged configuration. More specifically, seventh selective coupler 170 is in an engaged configuration and eighth selective coupler 172 is in a disengaged configuration in each of the $1^{st}$ through $9^{th}$ forward gear or speed ratios. Accordingly, output member 104 rotates in the same direction as input member 102. In order to reverse the direction of output member 104 relative to input member 102 for each of the $1^{st}$ through $9^{th}$ forward gear or speed ratios, seventh selective coupler 170 is placed in the disengaged configuration and eighth selective coupler 172 is placed in the engaged configuration. Placing seventh selective coupler 170 in the disengaged configuration and eighth selective coupler 172 in the engaged configuration and maintaining the selective engagement and disengagement configuration of selective couplers 158-168 for each of the $1^{st}$ through $9^{th}$ forward gear or speed ratios reverses the direction of output member 104 relative to input member 102 and establishes a complementary reverse gear or speed ratio. Because fifth planetary gearset 216 is positioned between input member 102 and first planetary gearset 108, second planetary gearset 110, third planetary gearset 112, and fourth planetary gearset 114, fifth planetary gearset 216 may be referred to as an input reversing planetary gearset.

A first reverse gear or speed ratio (shown as $1^{st}$ Rev) complementary to the first forward gear or speed ratio in exemplary truth table 200 of FIG. 2 is achieved by having fifth selective coupler 166, sixth selective coupler 168, and eighth selective coupler 172 in an engaged configuration and first selective coupler 158, second selective coupler 160, third selective coupler 162, fourth selective coupler 164, and seventh selective coupler 170 in a disengaged configuration. Therefore, when transitioning between the first forward gear or speed ratio and the first reverse gear or speed ratio, seventh selective coupler 170 is placed in the disengaged configuration and eighth selective coupler 172 is placed in the engaged configuration.

A second or subsequent reverse gear or speed ratio (shown as $2^{nd}$ Rev) complementary to the second forward gear or speed ratio in exemplary truth table 200 of FIG. 2 is achieved by having first selective coupler 158, fifth selective coupler 166, and eighth selective coupler 172 in an engaged configuration and second selective coupler 160, third selective coupler 162, fourth selective coupler 164, sixth selective coupler 168, and seventh selective coupler 170 in a disengaged configuration. Therefore, when transitioning between the first reverse gear or speed ratio and the second reverse gear or speed ratio, sixth selective coupler 168 is placed in the disengaged configuration and first selective coupler 158 is placed in the engaged configuration. When transitioning between the second forward gear or speed ratio and the second reverse gear or speed ratio, seventh selective coupler 170 is placed in the disengaged configuration and eighth selective coupler 172 is placed in the engaged configuration.

A third or subsequent reverse gear or speed ratio (shown as $3^{rd}$ Rev) complementary to the third forward gear or speed ratio in exemplary truth table 200 of FIG. 2 is achieved by having first selective coupler 158, sixth selective coupler 168, and eighth selective coupler 172 in an engaged configuration and second selective coupler 160, third selective coupler 162, fourth selective coupler 164, fifth selective coupler 166, and seventh selective coupler 170 in a disengaged configuration. Therefore, when transitioning between the second reverse gear or speed ratio and the third reverse gear or speed ratio, fifth selective coupler 166 is placed in the disengaged configuration and sixth selective coupler 168 is placed in the engaged configuration. When transitioning between the third forward gear or speed ratio and the third reverse gear or speed ratio, seventh selective coupler 170 is placed in the disengaged configuration and eighth selective coupler 172 is placed in the engaged configuration.

A fourth or subsequent reverse gear or speed ratio (shown as $4^{th}$ Rev) complementary to the fourth forward gear or speed ratio in exemplary truth table 200 of FIG. 2 is achieved by having first selective coupler 158, fourth selective coupler 164, and eighth selective coupler 172 in an engaged configuration and second selective coupler 160, third selective coupler 162, fifth selective coupler 166, sixth selective coupler 168, and seventh selective coupler 170 in a disengaged configuration. Therefore, when transitioning between the third reverse gear or speed ratio and the fourth reverse gear or speed ratio, sixth selective coupler 168 is placed in the disengaged configuration and fourth selective coupler 164 is placed in the engaged configuration. When transitioning between the fourth forward gear or speed ratio and the fourth reverse gear or speed ratio, seventh selective coupler 170 is placed in the disengaged configuration and eighth selective coupler 172 is placed in the engaged configuration.

A fifth or subsequent reverse gear or speed ratio (shown as $5^{th}$ Rev) complementary to the fifth forward gear or speed ratio in exemplary truth table 200 of FIG. 2 is achieved by having first selective coupler 158, third selective coupler 162, and eighth selective coupler 172 in an engaged configuration and second selective coupler 160, fourth selective coupler 164, fifth selective coupler 166, sixth selective coupler 168, and seventh selective coupler 170 in a disengaged configuration. Therefore, when transitioning between the fourth reverse gear or speed ratio and the fifth reverse gear or speed ratio, fourth selective coupler 164 is placed in the disengaged configuration and third selective coupler 162 is placed in the engaged configuration. When transitioning between the fifth forward gear or speed ratio and the fifth reverse gear or speed ratio, seventh selective coupler 170 is placed in the disengaged configuration and eighth selective coupler 172 is placed in the engaged configuration.

A sixth or subsequent reverse gear or speed ratio (shown as $6^{th}$ Rev) complementary to the sixth forward gear or speed ratio in exemplary truth table 200 of FIG. 2 is achieved by having first selective coupler 158, second selective coupler 160, and eighth selective coupler 172 in an engaged configuration and third selective coupler 162, fourth selective coupler 164, fifth selective coupler 166, sixth selective coupler 168, and seventh selective coupler 170 in a disengaged configuration. Therefore, when transitioning between the fifth reverse gear or speed ratio and the sixth reverse gear or speed ratio, third selective coupler 162 is placed in the disengaged configuration and second selective coupler 160 is placed in the engaged configuration. When transitioning between the sixth forward gear or speed ratio and the sixth reverse gear or speed ratio, seventh selective coupler 170 is placed in the disengaged configuration and eighth selective coupler 172 is placed in the engaged configuration.

A seventh or subsequent reverse gear or speed ratio (shown as $7^{th}$ Rev) complementary to the seventh forward gear or speed ratio in exemplary truth table 200 of FIG. 2 is achieved by having second selective coupler 160, third selective coupler 162, and eighth selective coupler 172 in an engaged configuration and first selective coupler 158, fourth selective coupler 164, fifth selective coupler 166, sixth selective coupler 168, and seventh selective coupler 170 in a disengaged configuration. Therefore, when transitioning between the sixth reverse gear or speed ratio and the seventh reverse gear or speed ratio, first selective coupler 158 is placed in the disengaged configuration and third selective coupler 162 is placed in the engaged configuration. When transitioning between the seventh forward gear or speed ratio and the seventh reverse gear or speed ratio, seventh selective coupler 170 is placed in the disengaged configuration and eighth selective coupler 172 is placed in the engaged configuration.

An eighth or subsequent reverse gear or speed ratio (shown as $8^{th}$ Rev) complementary to the eighth forward gear or speed ratio in exemplary truth table 200 of FIG. 2 is achieved by having second selective coupler 160, fourth selective coupler 164, and eighth selective coupler 172 in an engaged configuration and first selective coupler 158, third selective coupler 162, fifth selective coupler 166, sixth selective coupler 168, and seventh selective coupler 170 in a disengaged configuration. Therefore, when transitioning between the seventh reverse gear or speed ratio and the eighth reverse gear or speed ratio, third selective coupler 162 is placed in the disengaged configuration and fourth selective coupler 164 is placed in the engaged configuration. When transitioning between the eighth forward gear or speed ratio and the eighth reverse gear or speed ratio, seventh selective coupler 170 is placed in the disengaged configuration and eighth selective coupler 172 is placed in the engaged configuration.

A ninth or subsequent reverse gear or speed ratio (shown as $9^{th}$ Rev) complementary to the ninth forward gear or speed ratio in exemplary truth table 200 of FIG. 2 is achieved by having second selective coupler 160, sixth selective coupler 168, and eighth selective coupler 172 in an engaged configuration and first selective coupler 158, third selective coupler 162, fourth selective coupler 164, fifth selective coupler 166, and seventh selective coupler 170 in a disengaged configuration. Therefore, when transitioning between the eighth reverse gear or speed ratio and the ninth reverse gear or speed ratio, fourth selective coupler 164 is placed in the disengaged configuration and sixth selective coupler 168 is placed in the engaged configuration. When transitioning between the ninth forward gear or speed ratio and the ninth reverse gear or speed ratio, seventh selective coupler 170 is placed in the disengaged configuration and eighth selective coupler 172 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

In the illustrated embodiment, various combinations of three of the available selective couplers are engaged for each of the illustrated forward and reverse gear or speed ratios. Additional forward gear or speed ratios and reverse gear or speed ratios are possible based on other combinations of engaged selective couplers. Although in the illustrated embodiment, each forward gear or speed ratio and reverse gear or speed ratio has three of the available selective couplers engaged, it is contemplated that less than three and more than three selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the fifth planetary gearset;
an output member operatively coupled to the input member through the plurality of planetary gearsets and rotatable relative to the at least one stationary member, the output member is fixedly coupled to the second gearset component of the fourth planetary gearset;
a first interconnector which fixedly couples the second gearset component of the first planetary gearset, the second gearset component of the second planetary gearset, and the third gearset component of the third planetary gearset together;
a second interconnector which fixedly couples the third gearset component of the first planetary gearset and the first gearset component of the second planetary gearset together;
a third interconnector which fixedly couples the second gearset component of the third planetary gearset and the third gearset component of the fourth planetary gearset together;
a fourth interconnector which fixedly couples the first gearset component of the third planetary gearset and the first gearset component of the fourth planetary gearset together;
a fifth interconnector which fixedly couples the third gearset component of the fifth planetary gearset and the first gearset component of the first planetary gearset together; and
a plurality of selective couplers, wherein the plurality of selective couplers includes:
a first selective coupler which, when engaged, fixedly couples the third gearset component of the fifth planetary gearset and the first gearset component of the first planetary gearset to the first gearset component of the third planetary gearset and the first gearset component of the fourth planetary gearset;

a second selective coupler which, when engaged, fixedly couples the third gearset component of the fifth planetary gearset and the first gearset component of the first planetary gearset to the second gearset component of the third planetary gearset and the third gearset component of the fourth planetary gearset;

a third selective coupler which, when engaged, fixedly couples the third gearset component of the first planetary gearset and the first gearset component of the second planetary gearset to the at least one stationary member;

a fourth selective coupler which, when engaged, fixedly couples the second gearset component of the first planetary gearset, the second gearset component of the second planetary gearset, and the third gearset component of the third planetary gearset to the at least one stationary member;

a fifth selective coupler which, when engaged, fixedly couples the second gearset component of the third planetary gearset and the third gearset component of the fourth planetary gearset to the at least one stationary member;

a sixth selective coupler which, when engaged, fixedly couples the third gearset component of the second planetary gearset to the at least one stationary member;

a seventh selective coupler which, when engaged, fixedly couples the input member to the third gearset component of the fifth planetary gearset and the first gearset component of the first planetary gearset; and an eighth selective coupler which, when engaged, fixedly couples the second gearset component of the fifth planetary gearset to the at least one stationary member, wherein each of the first planetary gearset, the second planetary gearset, the third planetary gearset, the fourth planetary gearset, and the fifth planetary gearset is a simple planetary gearset.

2. The transmission of claim 1, wherein:

the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear;

the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

3. The transmission of claim 1, wherein the at least one stationary member includes a housing, the housing having a first end and a second end, wherein the input member is proximate the first end of the housing;

the output member is proximate the second end of the housing;

the first planetary gearset, the second planetary gearset, the third planetary gearset, and the fourth planetary gearset are positioned between the fifth planetary gearset and the second end of the housing; and the fifth planetary gearset is positioned between first end of the housing and the first planetary gearset, the second planetary gearset, the third planetary gearset, and the fourth planetary gearset.

4. The transmission of claim 3, wherein the first planetary gearset is positioned between fifth planetary gearset and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the second end of the housing.

5. The transmission of claim 1, wherein the plurality of selective couplers are selectively engaged in a plurality of combinations to establish at least nine forward speed ratios and at least nine reverse speed ratios between the input member and the output member, each of the plurality of combinations having at least three of the plurality of selective couplers engaged.

6. The transmission of claim 1, wherein the plurality of selective couplers are selectively engaged in a plurality of combinations to establish a first number of forward speed ratios and a second number of reverse speed ratios between the input member and the output member, each of the plurality of combinations having at least three of the plurality of selective couplers engaged, the second number being equal to the first number.

7. A transmission comprising:

at least one stationary member;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, each of the first planetary gearset, the second planetary gearset, the third planetary gearset, the fourth planetary gearset, and the fifth planetary gearset is a simple planetary gearset, the input member is fixedly coupled to only one of the plurality of planetary gearsets;

an output member operatively coupled to the input member through the plurality of planetary gearsets and rotatable relative to the at least one stationary member; and a plurality of selective couplers operatively coupled to the plurality of planetary gearsets, the plurality of selective couplers are selectively engaged in a plurality of combinations to establish a first number of forward speed ratios and a second number of reverse speed ratios between the input member and the output member, the plurality of selective couplers including a third number of brakes and a fourth number of clutches, the fourth number being less than the third number by two, and the plurality of selective couplers including:

a first selective coupler which, when engaged, fixedly couples the third gearset component of the first planetary gearset and the first gearset component of the second planetary gearset to the at least one stationary member; and
a second selective coupler, which, when engaged, fixedly couples the input member to the third gearset component of the fifth planetary gearset and the first gearset component of the first planetary gearset.

8. The transmission of claim 7, wherein the second number is equal to the first number.

9. The transmission of claim 8, wherein each of the plurality of combinations has three of the plurality of selective couplers engaged.

10. The transmission of claim 7, wherein the input member is fixedly coupled to the first gearset component of the fifth planetary gearset and the output member is fixedly coupled to the second gearset component of the fourth planetary gearset.

11. The transmission of claim 7, further comprising:
a first interconnector which fixedly couples the second gearset component of the first planetary gearset, the second gearset component of the second planetary gearset, and the third gearset component of the third planetary gearset together;
a second interconnector which fixedly couples the third gearset component of the first planetary gearset and the first gearset component of the second planetary gearset together;
a third interconnector which fixedly couples the second gearset component of the third planetary gearset and the third gearset component of the fourth planetary gearset together;
a fourth interconnector which fixedly couples the first gearset component of the third planetary gearset and the first gearset component of the fourth planetary gearset together; and
a fifth interconnector which fixedly couples the third gearset component of the fifth planetary gearset and the first gearset component of the first planetary gearset together.

12. The transmission of claim 7, wherein the plurality of selective couplers further includes:
a third selective coupler which, when engaged, fixedly couples the third gearset component of the fifth planetary gearset and the first gearset component of the first planetary gearset to the first gearset component of the third planetary gearset and the first gearset component of the fourth planetary gearset;
a fourth selective coupler which, when engaged, fixedly couples the third gearset component of the fifth planetary gearset and the first gearset component of the first planetary gearset to the second gearset component of the third planetary gearset and the third gearset component of the fourth planetary gearset;
a fifth selective coupler which, when engaged, fixedly couples the second gearset component of the first planetary gearset, the second gearset component of the second planetary gearset, and the third gearset component of the third planetary gearset to the at least one stationary member;
a sixth selective coupler which, when engaged, fixedly couples the second gearset component of the third planetary gearset and the third gearset component of the fourth planetary gearset to the at least one stationary member;
a seventh selective coupler which, when engaged, fixedly couples the third gearset component of the second planetary gearset to the at least one stationary member;

an eighth selective coupler which, when engaged, fixedly couples the second gearset component of the fifth planetary gearset to the at least one stationary member.

13. The transmission of claim 7, wherein:
the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear;
the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and
the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

14. The transmission of claim 7, wherein the at least one stationary member includes a housing, the housing having a first end and a second end, wherein
the input member is proximate the first end of the housing;
the output member is proximate the second end of the housing;
the first planetary gearset, the second planetary gearset, the third planetary gearset, and the fourth planetary gearset are positioned between the fifth planetary gearset and the second end of the housing; and
the fifth planetary gearset is positioned between first end of the housing and the first planetary gearset, the second planetary gearset, the third planetary gearset, and the fourth planetary gearset.

15. The transmission of claim 14, wherein
the first planetary gearset is positioned between fifth planetary gearset and the second planetary gearset;
the second planetary gearset is positioned between the first planetary gearset and the third planetary gearset;
the third planetary gearset is positioned between the second planetary gearset and the fourth planetary gearset; and
the fourth planetary gearset is positioned between the third planetary gearset and the second end of the housing.

16. A transmission comprising:
at least one stationary member;
an input member rotatable relative to the at least one stationary member;
a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, each of the first planetary gearset, the second planetary gearset, the third planetary gearset, the fourth planetary gearset, and the fifth planetary gearset is a simple planetary gearset;

an output member operatively coupled to the input member through the plurality of planetary gearsets and rotatable relative to the at least one stationary member; and a plurality of selective couplers operatively coupled to the plurality of planetary gearsets, the plurality of selective couplers are selectively engaged in a plurality of combinations to establish a first number of forward speed ratios and a second number of reverse speed ratios between the input member and the output member, the plurality of selective couplers including a third number of brakes and a fourth number of clutches, the third number is odd and two more than the fourth number, and the plurality of selective couplers including:

a first selective coupler which, when engaged, fixedly couples the third gearset component of the first planetary gearset and the first gearset component of the second planetary gearset to the at least one stationary member; and a second selective coupler, which, when engaged, fixedly couples the input member to the third gearset component of the fifth planetary gearset and the first gearset component of the first planetary gearset.

17. The transmission of claim 16, wherein the second number is equal to the first number.

18. The transmission of claim 17, wherein each of the plurality of combinations has three of the plurality of selective couplers engaged.

19. The transmission of claim 16, wherein the input member is fixedly coupled to the first gearset component of the fifth planetary gearset and the output member is fixedly coupled to the second gearset component of the fourth planetary gearset.

20. The transmission of claim 16, further comprising:

a first interconnector which fixedly couples the second gearset component of the first planetary gearset, the second gearset component of the second planetary gearset, and the third gearset component of the third planetary gearset together;

a second interconnector which fixedly couples the third gearset component of the first planetary gearset and the first gearset component of the second planetary gearset together;

a third interconnector which fixedly couples the second gearset component of the third planetary gearset and the third gearset component of the fourth planetary gearset together;

a fourth interconnector which fixedly couples the first gearset component of the third planetary gearset and the first gearset component of the fourth planetary gearset together; and a fifth interconnector which fixedly couples the third gearset component of the fifth planetary gearset and the first gearset component of the first planetary gearset together.

21. The transmission of claim 16, wherein the plurality of selective couplers further includes:

a third selective coupler which, when engaged, fixedly couples the third gearset component of the fifth planetary gearset and the first gearset component of the first planetary gearset to the first gearset component of the third planetary gearset and the first gearset component of the fourth planetary gearset;

a fourth selective coupler which, when engaged, fixedly couples the third gearset component of the fifth planetary gearset and the first gearset component of the first planetary gearset to the second gearset component of the third planetary gearset and the third gearset component of the fourth planetary gearset;

a fifth selective coupler which, when engaged, fixedly couples the second gearset component of the first planetary gearset, the second gearset component of the second planetary gearset, and the third gearset component of the third planetary gearset to the at least one stationary member;

a sixth selective coupler which, when engaged, fixedly couples the second gearset component of the third planetary gearset and the third gearset component of the fourth planetary gearset to the at least one stationary member;

a seventh selective coupler which, when engaged, fixedly couples the third gearset component of the second planetary gearset to the at least one stationary member;

an eighth selective coupler which, when engaged, fixedly couples the second gearset component of the fifth planetary gearset to the at least one stationary member.

22. The transmission of claim 16, wherein:

the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear;

the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier; and the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

23. The transmission of claim 16, wherein the at least one stationary member includes a housing, the housing having a first end and a second end, wherein the input member is accessible proximate the first end of the housing;

the output member is accessible proximate the second end of the housing;

the first planetary gearset, the second planetary gearset, the third planetary gearset, and the fourth planetary gearset are positioned between the fifth planetary gearset and the second end of the housing; and the fifth planetary gearset is positioned between first end of the housing and the first planetary gearset, the second planetary gearset, the third planetary gearset, and the fourth planetary gearset.

24. The transmission of claim 23, wherein the first planetary gearset is positioned between fifth planetary gearset and the second planetary gearset;

the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the second end of the housing.

* * * * *

UNITED STATES PATENT AND TRADEMARK OFFICE
CERTIFICATE OF CORRECTION

| | | |
|---|---|---|
| PATENT NO. | : 11,867,266 B2 | Page 1 of 1 |
| APPLICATION NO. | : 17/783466 | |
| DATED | : January 9, 2024 | |
| INVENTOR(S) | : Nayan Patel, Michael Rietdorf and Jorge F. Briceno | |

It is certified that error appears in the above-identified patent and that said Letters Patent is hereby corrected as shown below:

In the Claims

Claim 12, Column 21, Line 67, please insert --and-- after "member;"
Claim 21, Column 24, Line 19, please insert --and-- after "member;"

Signed and Sealed this
Fourth Day of June, 2024

Katherine Kelly Vidal
*Director of the United States Patent and Trademark Office*